United States Patent [19]

Fauth

[11] 4,194,825

[45] Mar. 25, 1980

[54] PHOTOGRAPHIC CAMERA

[75] Inventor: Günter Fauth, Unterhaching, Fed. Rep. of Germany

[73] Assignee: AGFA-Gevaert, A.G., Leverkusen, Fed. Rep. of Germany

[21] Appl. No.: 853,577

[22] Filed: Nov. 21, 1977

[30] Foreign Application Priority Data

Nov. 24, 1976 [DE] Fed. Rep. of Germany ....... 2653247

[51] Int. Cl.² .......................... G03B 1/00; G03B 17/52
[52] U.S. Cl. ....................................... 354/212; 354/86
[58] Field of Search ............... 354/212, 204, 213, 266, 354/268, 86, 90

[56] References Cited

U.S. PATENT DOCUMENTS

| | | | |
|---|---|---|---|
| 3,468,231 | 9/1969 | Starp | 354/212 |
| 3,709,122 | 1/1973 | Blinow et al. | 354/213 |
| 3,984,851 | 10/1976 | Goto | 354/212 |
| 3,987,469 | 10/1976 | Winkler et al. | 354/212 |
| 3,994,006 | 11/1976 | Ichii | 354/212 |

OTHER PUBLICATIONS

Kodak Researach Disclosure #13326, 5-1975, p. 7.

*Primary Examiner*—L. T. Hix
*Assistant Examiner*—Thomas H. Tarcza
*Attorney, Agent, or Firm*—Michael J. Striker

[57] ABSTRACT

A photographic camera, particularly an instant-picture camera, has a set of transporting rollers between which a film is advanced. An actuating arrangement is mounted for movement from a starting position to an operating position in order to rotate the transporting rollers, and back to the starting position. An energy storing arrangement is connected to the actuating arrangement and stores energy during movement of the same to the starting position, this energy being dissipated during movement of the actuating arrangement to the operating position in order to thereby aid in such movement.

8 Claims, 5 Drawing Figures

PHOTOGRAPHIC CAMERA

BACKGROUND OF THE INVENTION

1. Field of the Invention

This invention relates to photographic cameras in general, and particularly (but not exclusively) to photographic cameras of the instant-picture type.

2. The Prior Art

It is already known to provide photographic cameras, including those of the instant-picture type, with manually operated film transporting arrangements. Basically, there are two types of such arrangements: one type in which the transporting arrangement moves in only one direction as is the case e.g. with cranks that must be turned by a user, and the other type in which the transporting arrangement effects film movement while it moves in one direction, but is inoperative to effect film movement while it is moved in the other direction; this latter type includes slides which are pushed by the fingers of a user, levers and the like.

In the case of transporting arrangements which are moved in one direction to transport the film and are inoperative as they are moved in the opposite direction to return to their starting position, it is necessary that the arrangement perform a substantial amount of work (transporting the film, squeezing developer fluid from the reservoir pouch if instant pictures are involved, spreading the developer fluid over the film) while the transporting arrangement is moved through a relatively short distance in performing its operating stroke. This means that the amount of force which must be supplied by the user is rather high, and this, in turn, is frequently found to be a disadvantage or, at the very least, an annoyance to the user.

SUMMARY OF THE INVENTION

Accordingly, it is an object of the present invention to avoid the prior-art disadvantages.

More particularly, it is an object of the present invention to provide an improved photographic camera, particularly but not exclusively an instant-picture camera, wherein the force required to be supplied by a user during movement of the film-transporting arrangement in its operating stroke, is reduced as compared to the amount of force required with the prior-art constructions.

Another object of the invention is to provide such an improved camera wherein the structure necessary to achieve the desired results is relatively simple and inexpensive.

A concomitant object is to provide such a photographic camera wherein the aforementioned structure is highly reliable in its operation.

In keeping with these objects, and with others which will become apparent hereafter, one aspect of the invention resides in a photographic camera, particularly in an instant-picture camera. Briefly stated, the camera according to the present invention may comprise transporting means for transporting a film, actuating means mounted for movement from a starting position to an operating position to thereby operate the transporting means and back to the starting position, and energy storing means connected to the actuating means and operative for storing energy during the movement to the starting position and to dissipate the stored energy during and thereby aid in the movement to the operating position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
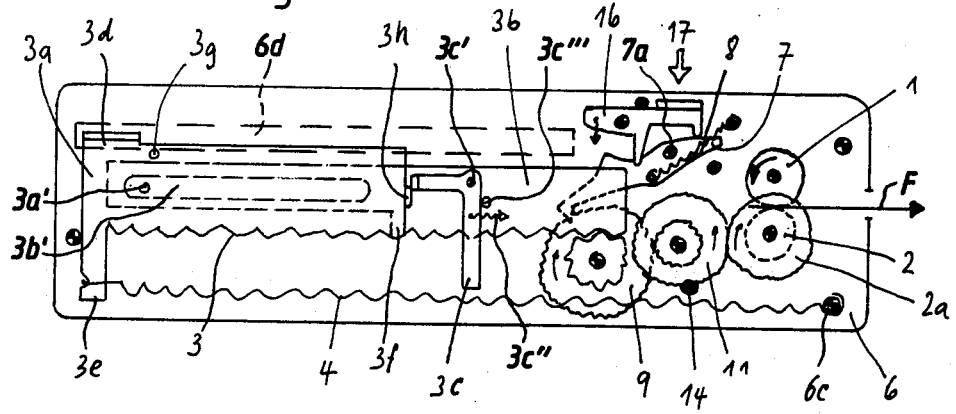
FIG. 1 is a somewhat diagrammatic side elevation of a camera embodying the present invention, with the wall facing towards the viewer removed to show the interior and the components embodying the invention illustrated in a condition in which energy is stored.
Figure 2:
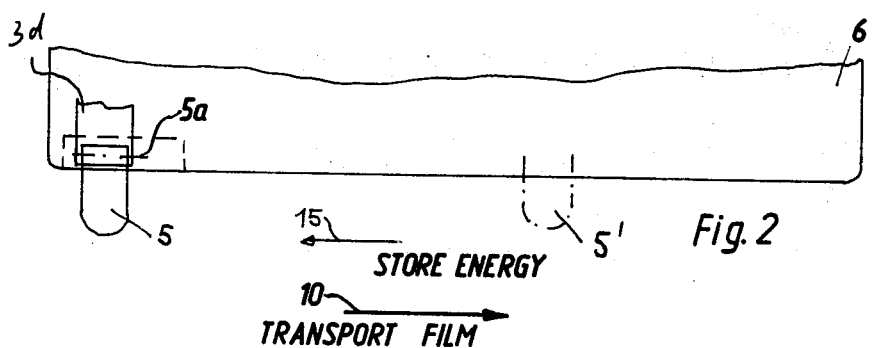
FIG. 2 is a fragmentary top-plan view of FIG. 1.
Figure 3:
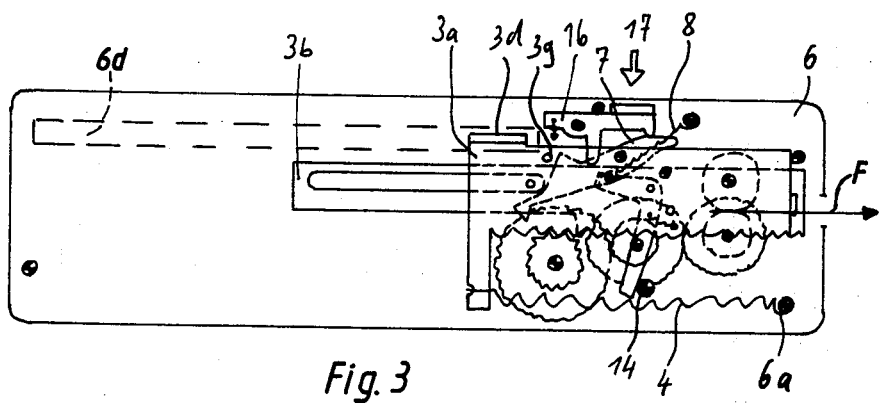
FIG. 3 is a view similar to FIG. 1, but showing the components thereof in a condition in which the stored energy has been dissipated.

Referring now to the drawing, and firstly to FIGS. 1-3 thereof, it will be seen that reference numeral 6 shows diagrammatically a camera housing which should be understood to be dimensioned and arranged to accommodate a film cassette, particularly a film cassette with a pack of instant-picture film sheets as they are known from the art, i.e. film sheets which are provided at their leading end (as considered in the direction of film transport) with reservoir pouches containing developing fluid that during the film advancement is to be squeezed from the respective pouch and spread over the picture area of the respective film sheet in order to cause development of a latent exposed image. Cameras of this type are provided with a claw or gripper (not shown) which withdraws always the film sheet that is located uppermost in the cassette (in which the stack of film sheets is spring loaded and urged towards an uppermost position) and which transports the leading end of the film sheet into the nip between two transporting rollers 1 and 2 which grip the film sheet and transport it in the direction of the arrow F while squeezing developing fluid out of the reservoir pouch to spread it over the exposed image area. Details of the gripper and of the construction of the film pack (film cassette) are not needed herein because they are conventional and known per se in the art. One end of one of the rollers 1, 2, in this instance of the roller 2, is provided with a gear 2a which can be turned to impart motion to the roller 2 (and hence to the roller 1) by means of a gear train 11, 9 that in turn receives motion from a rack 3.

The rack 3 is mounted in the camera housing 6 so that it can move in the direction of the arrows 10, 15 (compare FIG. 2). It is shown in FIG. 1 in the starting position from which it must move in the direction of the arrow 10 in order to transport the next film sheet into the nip of the rollers 1, 2. When it is pushed in the direction of the arrow 10, the rack 3 turns the gear train 11, 9 and thus rotates the rollers 1, 2 so that, when the gripper (which is not shown) pushes the leading end of the film sheet into the nip of the rollers 1, 2 these rollers will transport it in the direction of the arrow F.

In the embodiment of FIGS. 1–3 the rack 3 is composed of two sections 3a and 3b which are mounted so that they can move with reference to one another. This construction is chosen in this embodiment to provide having portions of the rack 3 extend beyond one side of the camera (e.g. the left-hand side) which would be necessary if the rack 3 were of one piece, it being evident from the drawing that to drive the rollers 1, 2 for a sufficient length of time for the film sheet to be expelled in the direction of the arrow F from the housing 6, it would be necessary for the rack 3 to have such a length that a portion would need to project beyond one side of the camera. This problem is avoided by making the rack of the two sections 3a and 3b which can slide relative to one another and which, in the position shown in FIG. 1, overlap one another in the area 3f and are blocked against relative movement by a pawl 3c which is mounted for pivoting on a pivot 3c' and is urged by a spring 3c'' against an abutment 3c''' on the section 3b. The section 3a has a lug 3d on which a handle 5 is mounted so that it can pivot about a pivot axis 5a (FIG. 2). The handle 5 extends outwardly of the camera housing 6 through a slot 6d and can be shifted from the full-line position of FIG. 2 to the broken-line position 5' in FIG. 2 to thereby move the rack 3 from the position of FIG. 1 to the position of FIG. 3.

The pawl 3c has an arm which is shown to be projecting downwardly in FIG. 1. The pawl 3c moves with the section 3b of the rack 3 and in the path of its downwardly projecting arm the camera is provided on a stationary component thereof, e.g. the housing or another component, with an abutment 14 which is engaged by this downwardly projecting arm. Continued movement of the rack 3 towards the right after such engagement has taken place will cause the pawl 3c to pivot about the pivot 3c' in clockwise direction, thereby disengaging the pawl from an abutment 3h provided on the section 3a of the rack 3. The camera is further provided with another pawl 7 which is pivoted at 7a and is biased by a spring 8 one end of which is connected to a stationary component of the camera and the other end of which is connected to the pawl 7 at or near the center thereof in such a manner that when the pawl 7 is displaced in clockwise direction by pressure upon the release member 16 in the direction of the arrow 17, the pawl 7 will move in clockwise direction out of the position shown in FIG. 1 and will be held in its new position by the spring 8 which acts as an over-center spring (note that pivot 7a is not located at the center of pawl 7, but is offset towards the right from the center). The left-hand end of the pawl 7 is engageable, as shown in FIGS. 1 and 3, with the gear 9 of the gear train 9, 11.

The section 3a of the rack 3 is provided, in addition to the lug 3d, with a further lug 3e to which one end of a relatively strong extension spring 4 is connected, the other end of which is secured at 6c to the housing 6 so that the spring 4 permanently tends to bias the rack 3 towards the right in the drawing.

When the camera is in the condition shown in FIG. 1 the spring 4 is tensioned, i.e. has stored energy, and a relative movement of the sections 3a and 3b is prevented by engagement of the pawl 3c with the abutment 3h of the section 3a. Rotation of the gear 9 in the direction indicated by the arrow is prevented by engagement of the gear with the pawl 7; this also serves to block rightward movement of the rack 3 under the urging of the spring 4. If, in this condition, the release 16 is depressed in the direction of the arrow 17, the pawl 7 is displaced in clockwise direction and becomes disengaged from the gear 9; it is subsequently held in its new position by the over-center action of the spring 8. This is true even if the pressure on the release 16 in the direction of the arrow 17 is subsequently relaxed again. The release 16, incidentally, need not be the shutter release for the camera (although it can be) but can be a separate release which permits only the film transporting function to take place and which may be operated manually subsequent to an exposure or which may be automatically actuated by the closure member of the shutter as the same returns to its closed position following the making of an exposure.

In any case, the spring 4 is so selected that as a rule the energy which it stores is not sufficient to transport the film sheets to and through the nip between the rollers 1 and 2, particularly not strong enough to overcome the resistance offered by the film sheet as its developer-fluid pouch has to pass between the rollers 1, 2 to be squeezed by the same. It would be possible, of course, to make the spring 4 sufficiently strong to achieve this, but so strong a spring would then require an objectionable amount of force to be supplied by the user in order to move it from the position of FIG. 3 to the energy-storing position of FIG. 1. Hence, the spring 4 itself is selected weaker and the handle 5 is provided which is engaged by a user and moved to the position 5' in FIG. 2, such movement being aided by the energy-dissipating function of the spring 4. During this movement the two sections 3a, 3b of the rack 3 move towards the right and the gears 9, 11, 2a turn and rotate the rollers 1, 2. At the beginning of this movement the gripper or claw (not shown) mentioned earlier is activated—it may be connected with the rack 3—and pushes the film sheet which is uppermost in the film pack cassette (not shown) towards the right until the right-hand end of the film sheet (the leading end thereof) moves into the nip between the rollers 1, 2. During the right-hand movement of the sections 3a, 3b the downwardly projecting arm of the pawl 3c engages the abutment 14 and the pawl 3c is pivoted in clockwise direction, disengaging the abutment 3h of the section 3a so that the section 3a can now continue its rightward movement alone whereas the section 3b remains stationary as from this time. The relative movement of the sections 3a, 3b is made possible by the pin-and-slot connection 3a', 3b' between them. Finally, the section 3a will reach the right-most position shown in FIG. 3 at which time the film sheet has been expelled from the rollers 1, 2 in the direction of the arrow F. Just before the ultimate position of the section 3a is reached, as shown in FIG. 3, an abutment such as pin 3g on the section 3a engages the pawl 7 and pivots it downwardly again in counterclockwise direction, until it re-engages with the teeth of the gear 9.

Before the next exposure is made the handle 5 must be returned from the position 5' to the solid-line position in FIG. 2. During this movement, i.e. during such leftward movement as indicated by the arrow 15, the gear 9 can turn because it is blocked by engagement with the pawl 7 only against rotation in clockwise direction, but is free to rotate in counterclockwise direction. Therefore, the section 3a of the rack 3 will initially move towards the left in the direction of the arrow 15 and the section 3b will remain stationary. This continues until the section 3a entrains the section 3b by abutment of the pin 3a' against the left-hand end of slot 3b' whereupon the section 3b now also moves towards the left. At the time of entrainment the pawl 3c can also snap back to the position shown in FIG. 1 engaging the abutment 3h and locking the section 3a, 3b together against relative movement. The spring 4 is tensioned (stores energy) during the entire left-ward movement of the rack 3, so that this energy is available for later dissipation during the next-following transporting movement, i.e. movement in the direction of the arrow 10 towards the right again. During the left-hand movement the shutter (not shown) may be cocked; suitable connections between the shutter and a film-transporting mechanism are well known in the art for this purpose and need not be described. Also, during this movement the gripper for the film sheets is returned to its starting position. The rollers 1, 2 idle during the movement of rack 3 in the direction of arrow 15; if desired this can be prevented by interposing a coupling in the gear train 2a, 11, 9 which is activated by rack 3 as the same moves in the direction of the arrow 15 and disconnects the gear train from the rollers 1, 2.

Figure 4:
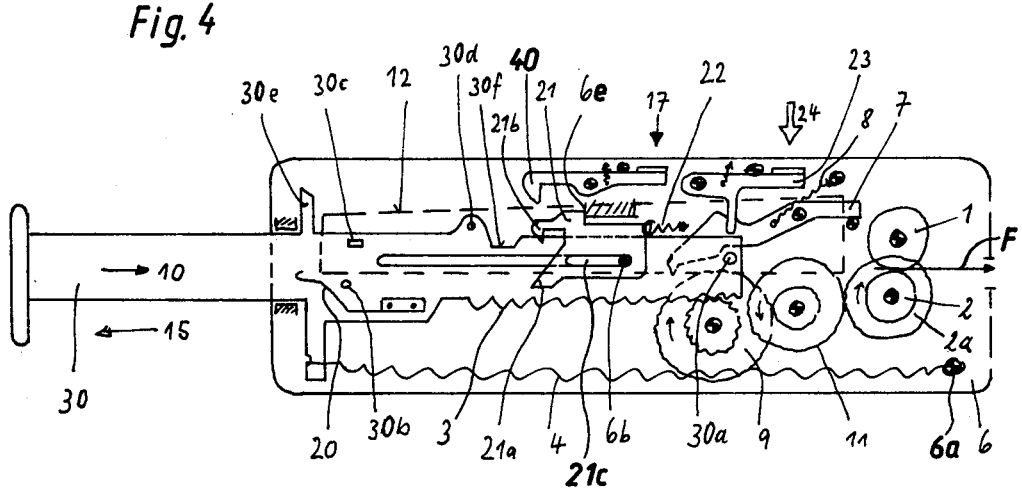
FIG. 4 is a view similar to FIG. 1, but illustrating a different embodiment of the invention.
Figure 5:
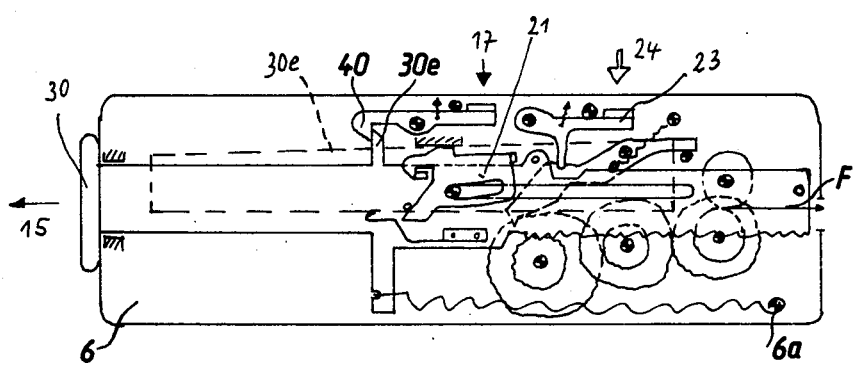
FIG. 5 is a view similar to FIG. 3, illustrating the embodiment of FIG. 4 in the condition in which the energy is dissipated.

A further embodiment of the invention is shown in FIGS. 4 and 5 where the rack 30 is of one piece and hence projects outwardly beyond the left-hand end or side of the camera housing 6 when in its starting position. Like reference numerals in FIGS. 4 and 5 identify the same elements as those having the identical reference numerals in FIGS. 1–3.

In FIGS. 4 and 5 a slide member 21 is provided which is biased towards the right by a spring 22 an end of which is connected to a stationary component of the camera, e.g. the housing 6. The rack 30 and the member 21 are connected with one another by means of a pin-and-slot connection 6b, 21c, the pin 6b of which also acts as a pivot about which the member 21 can tilt to a limited extent. The rack 30 is provided with a projection or pin 30a which, in the position of FIG. 4, lifts the pawl 7 in clockwise direction out of engagement with the gear 9 so that the rack 30 can be pushed towards the right in the direction of the arrow 10 to effect rotation of the gear train 9, 11, 2a and consequently turning of the rollers 1, 2. For purposes of orientation the claw or gripper 20 which engages the respectively uppermost film sheet in the film pack 12 has been illustrated in this embodiment.

FIG. 4 shows the arrangement in the starting position in which the spring 4 stores energy, the spring 22 also stores energy and the not illustrated camera shutter (and if desired also a flash mechanism thereof) are cocked. The pin 30a has raised the pawl 7 by pivoting it in clockwise direction, as mentioned before, and the pawl is maintained in this position by the spring 8. When the rack 30 is pushed into the camera in the direction of the arrow 10 and turns the gear train 9, 11, 2a the gripper 20 pushes the uppermost film sheet in the film pack cassette 12 towards the right in the direction of the arrow F, into the nip between the rollers 1 and 2. The rollers squeeze developing fluid out of the pouch of the film sheet and during further movement of the film sheet through the nip between them spread it upon the exposed portion of the film sheet. This type of instant-picture film sheet is usually provided at its end opposite the one where the developer pouch is located, with another pouch, a so-called "developer trap" into which excess developer is squeezed by the rollers 1, 2. As soon as this other pouch reaches the rollers 1, 2 the pin or projection 30b of the rack 30 engages an inclined cam face 21a of the member 21 to tilt it downwardly in counterclockwise direction about the pivot 6b and to disengage it from a surface 6e on a stationary component, e.g. a part of the camera housing 6. This causes the projection 21b of the member 21 to engage behind the projection 30c of the rack 30 so that the right-ward bias of the spring 22 (which tends to contact) is now added to the force exerted by the spring 4 and aids in right-ward movement of the rack 30 as both of the springs dissipate energy.

Continued movement of the rack 30 in the direction of the arrow 10 to the position of FIG. 5 results in engagement of the pin or projection 30d of rack 30 with the pawl 7 which is thereby tilted in counterclockwise direction into engagement with the teeth of gear 9 which is now blocked against clockwise rotation during subsequent return movement of the rack 30 in the direction of the arrow 15. A film transport blocking device 40 may be provided which may snap behind the projection 30e of rack 30 at the same time as the pawl 7 re-engages gear 9 (see FIG. 5). The shutter release mechanism of the camera is blocked against actuation over the entire range of movement of the rack 30 and can be operated only when the recess 30f of the rack 30 is in the position illustrated in FIG. 5. If the release 23 is depressed in the direction of the arrow 24 when the recess 30f is in the position of FIG. 5, then the transport blocking device 40 is disengaged by pressure in the direction of arrow 17 (such pressure may be exerted by a portion of the not-illustrated shutter as the same performs its closing movement) and the rack 30 can then be returned in the direction of the arrow 15. During such return movement the member 21 moves with the rack 30 until it snaps back behind the abutment surface 6e (note that it is being permanently urged to pivot in clockwise direction about the pivot 6b by its spring 22) and its tooth 21b thereby becomes disengaged from the projection 30c of the rack 30.

While the invention has been illustrated and described as embodied in an instant-picture camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera, particularly in an instant-picture camera, a combination comprising a housing; transporting means, including a plurality of transporting elements for transporting a film; manually operable actuating means extending in part from said housing and mounted for movement relative to said housing from a starting position to an operating position to thereby operate said transporting means, and back to said starting position, said actuating means comprising an actuating portion which is engageable by the fingers of a user, a rack composed of at least two rack sections which are shiftable lengthwise of each other during said movement, and gear means driven by said rack and drivingly connected with said transporting means; and energy storing spring means connected to at least one of said rack sections and to a stationary part of the camera and operative for storing energy during said movement to the starting position, and to dissipate the stored energy during and thereby aid in the subsequent movement to the operating position.

2. A combination as defined in claim 1; further comprising means blocking relative shifting of said rack sections during a first part of said movement to the operative position, and means releasing said blocking means during a second part of the same movement.

3. A combination as defined in claim 2, said blocking means comprising a spring pawl, and said releasing means comprising an abutment engageable by said spring pawl.

4. A combination as defined in claim 1, said rack including a part which projects to the exterior of said housing when said rack is in said starting position.

5. A combination as defined in claim 4, wherein said actuating portion is provided on said part of said rack.

6. In a photographic camera, particularly in an instant-picture camera, a combination comprising a housing; transporting means, including a plurality of transporting elements for transporting a film; manually operable actuating means including a slideable first member and a slideable second member, extending in part from said housing and mounted for movement relative to said housing from a starting position to an operating position to thereby operate said transporting means, and back to said starting position; energy storing spring means connected to said actuating means and operative for storing energy during said movement to the starting position, and to dissipate the stored energy during and thereby aid in the subsequent movement to the operating position, said spring means comprising a first and a second spring which are connected to said first and second members, respectively, to store energy during movement of the same to said starting position; and latch means normally latching said second member against movement to said operating position, but releasable during the terminal portion of the movement of said first member to said operating position so that the energy stored by said second spring is added to the energy stored by said first spring.

7. A combination as defined in claim 6; further comprising means mounting said second member for sliding movement between said positions as well as for pivoting movement relative to said first member.

8. A combination as defined in claim 6; and further comprising means for preventing operation of said transporting means during movement of said actuating means to said starting position.

* * * * *